Patented Aug. 12, 1924.

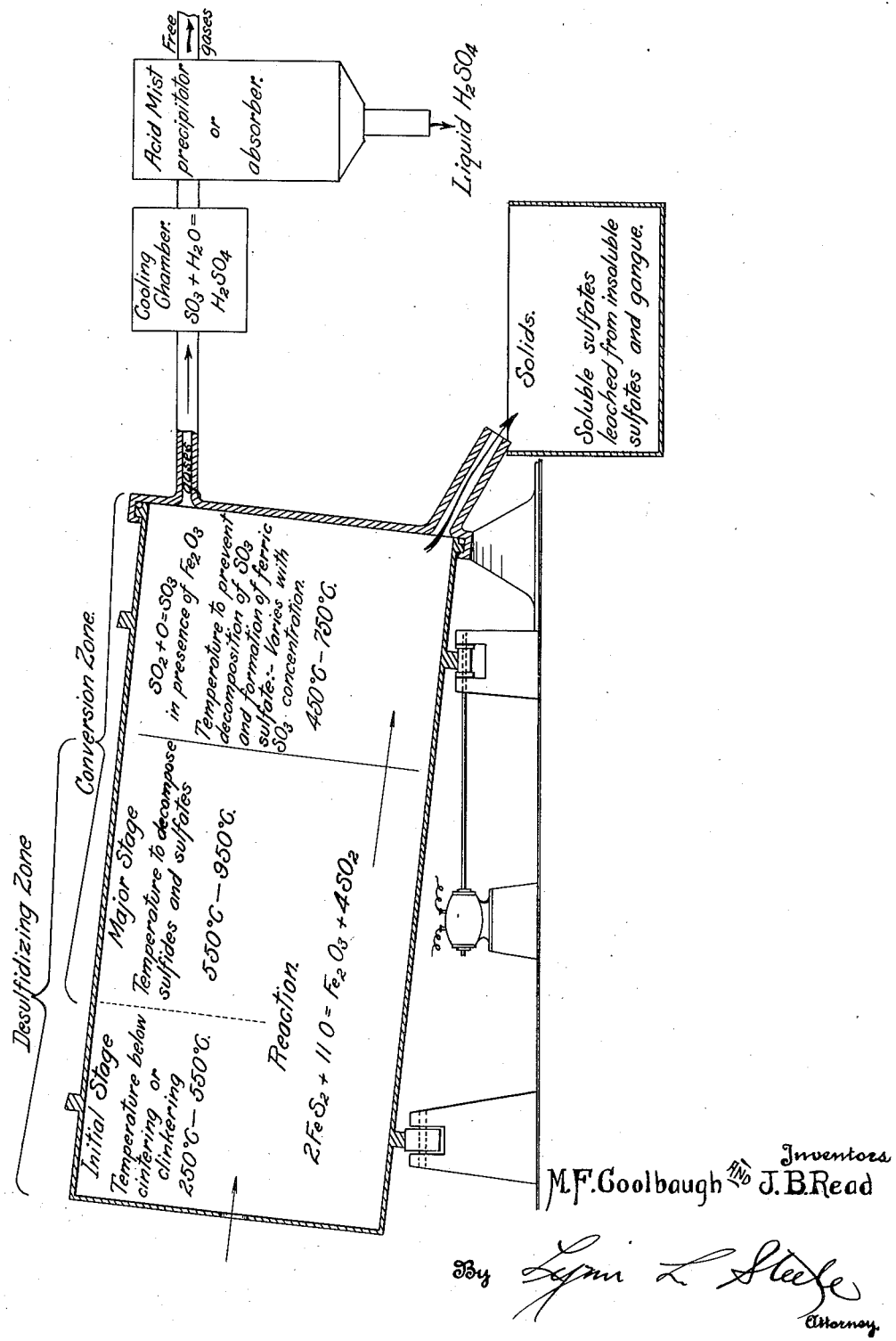

1,504,813

UNITED STATES PATENT OFFICE.

MELVILLE F. COOLBAUGH AND JOHN BURNS READ, OF GOLDEN, COLORADO, ASSIGNORS TO THE COMPLEX ORES RECOVERIES COMPANY, OF DENVER, COLORADO, A CORPORATION OF COLORADO.

PROCESS FOR PRODUCING SULPHURIC ANHYDRIDE AND SULPHURIC ACID.

Application filed May 29, 1922. Serial No. 564,514.

*To all whom it may concern:*

Be it known that we, MELVILLE F. COOLBAUGH and JOHN BURNS READ, citizens of the United States, and residents of Golden, in the county of Jefferson, State of Colorado, have invented certain new and useful Improvements in Processes for Producing Sulphuric Anhydride and Sulphuric Acid; and we do declare the following to be a full, clear, and exact description of the invention, such as will enable others skilled in the art to which it appertains to make and use the same, reference being had to the accompanying drawings, which form a part of this specification.

The object of this invention is the production of sulphuric acid and sulphuric anhydride directly from sulfur bearing minerals by a short cheap method with a high percentage conversion of the sulfur content of the mineral.

Briefly the invention comprises a continuous roast of a sulfur bearing mineral containing iron, to form sulfur dioxide ($SO_2$) and ferric oxide ($Fe_2O_3$), and to convert the sulfur dioxide into sulfur trioxide ($SO_3$), the ferric oxide serving as a catalytic agent for $SO_3$ formation. This conversion is efficiently effected by advancing the mineral, air for oxidation and the liberated gases concurrently and continuously in the same direction throughout the process. For the maximum production of sulfur trioxide several conditions should be fulfilled: (1) a temperature should be attained and maintained for the efficient reaction between sulfur dioxide and oxygen in the presence of ferric oxide; (2) the maximum ferric oxide should be produced; (3) the ferric oxide should have the maximum available surface; (4) the temperature of the discharge end of the furnace should be such that only the minimum quantity of iron sulfates will form. The sulphuric acid is produced by the reaction of water or water vapor with the sulfur trioxide gas, but this takes place only at a reduced temperature.

The essential chemical reactions as applied to pyrite are as follows:

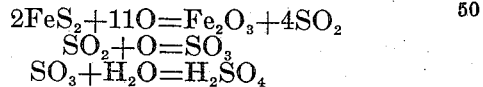

More specifically the process, which is illustrated diagrammatically in the accompanying drawings, is as follows: The mineral, such as iron pyrite is suitably crushed to a size of about two mesh and smaller, and is introduced with air into a suitable type of roasting furnace wherein the mineral, air for oxidation, liberated gases and steam or water vapor are continuously carried along together, that is "concurrently," throughout the operation. If the ore or concentrate carries a sufficient amount of moisture no further addition thereof need be made. Or, steam or water vapor may be added at any place in the furnace, or may even be added to the gases after they are discharged from the furnace if this is found more convenient or advisable.

The temperature at the charging end of the furnace should be kept below the sintering or clinkering stage or temperature of the mineral, and an amount of air carrying at least an equivalent quantity of oxygen to satisfy the essential chemical reactions should be introduced. If the temperature at this point is too high or the mineral is heated up too rapidly, or there is not enough air or oxygen present, some ferrous silicate or ferrous oxide (FeO) or magnetite ($Fe_3O_4$) may form. These compounds even in small quantities associated with ferric oxide materially retard the conversion of $SO_2$ into $SO_3$. Small quantities of copper, manganese and other substances associated with the ferric oxide materially accelerate this conversion.

To produce the maximum available surface in the ferric oxide also, it is necessary to keep the temperature rather low in the early stages of the roast. The pyrite or iron sulfide mineral should lose its sulfur somewhat slowly and leave an oxide with the maximum number of pores which will present the maximum available surface for gas contact. This maximum surface is very important in determining the rate and extent of the conversion of $SO_2$ into $SO_3$, since the greater the surface of the catalyzer ($Fe_2O_3$) the higher the rate of conversion. Efficient temperatures at the charging end of the furnace have ranges between 250° C. and 550° C. Above 550° C., the pyrite is liable to sinter, and thereby reduce the yield and also reduce the efficiency of the ferric oxid as a catalyst.

The rate of rabbling or stirring the mineral in the early stages of roasting has an influence upon the formation of ferrous silicate, ferrous oxide and magnetite and also upon the available surface of the ferric oxide formed. The more rapid the stirring, the smaller the quantity of the lower oxides of iron, the greater the quantity of $Fe_2O_3$ formed and the greater the available surface of the $Fe_2O_3$.

The temperature throughout the remainder or the major stage of the desulfidizing zone does not require close regulation and may range between 550° C. and 950° C.

The best temperature conditions for the conversion of $SO_2$ into $SO_3$ in the presence of ferric oxide will lie also within the above range, that is between 550° C. and 950° C. The exact temperature cannot be stated since it will vary with conditions of pressure, concentration of gases, purity and condition of the ferric oxide, and the like. Thus the best temperature becomes a function of the catalytic agent, $Fe_2O_3$. As the roasted minerals and gases travel through the conversion zone toward the discharge end of the furnace the temperature should be lowered somewhat, since at high temperatures $SO_3$ tends to break into $SO_2$ and oxygen. This temperature must not be lowered however to a point where appreciable ferric oxide and $SO_3$ react to form ferric sulfate or basic ferric sulfate. Otherwise, sulfur that is desired in the gas will be retained in the residue. The temperature at which the sulfates form is a function of the concentration of the $SO_3$ gas. The more concentrated the $SO_3$ content the higher the temperature required to decompose a given sulfate or prevent its formation. The temperature at the discharge end of the furnace may therefore vary between rather wide limits. Temperatures between 450° C. and 750° C. have given good results, and it has been possible to obtain as high as 60% conversion. In view of these variations in temperature and other conditions, the conversion zone may overlap well into the major stage of the desulfidizing zone as indicated in the drawings. In fact conversion may start at the beginning of the major or higher-temperature stage of the desulfidizing zone. However the conversion zone extends beyond the desulfidizing zone and usually runs to a somewhat lower temperature as above indicated.

The sulfur trioxide gas after its leaving the furnace is cooled, and it then unites with the moisture or water vapor, added or produced as above described, to form sulphuric acid which occurs in the form of mist. This acid mist may be passed through a precipitator or absorbed by any suitable method or recovered in any other manner desired.

On the other hand it may be desired to use the sulfur trioxide in gaseous form for such purposes as conditioning flue gases to precipitate the dust therefrom by electrostatic precipitators. In such an instance the $SO_3$ will be removed from the furnace as such and will be introduced into the flue gases in gaseous form either with water vapor under a temperature too high to form acid mist, or without water vapor, in which cases the dust alone will be precipitated and the $SO_3$ may be subsequently recovered from the gases passing through the precipitator, in any manner desired such as separate precipitation in the form of acid. However, the sulfur trioxide gas may be introduced into the flue gases with water vapor at a temperature to form acid mist so that the acid will be precipitated with the dust.

The calcined residue discharged from the furnace may contain values in copper, lead, zinc, gold and silver. If these are sufficiently high a water or dilute sulphuric acid leach may be applied. The copper and zinc will go into solution and the lead, gold and silver will remain with the residue. The values from the solution may be recovered by any of the approved methods. The residue may go to the lead smelter or may be treated with cyanide for the recovery of the gold and silver. If the residue contains little or no values in lead, gold and silver, and is high of iron content it may go direct to the iron blast furnace.

It will be noted that the maximum contact surface per unit of ferric oxide above mentioned, is presented continuously and is maintained by reason of the continuous, concurrent operation of the process. Thus even if the pores of the oxide become clogged with dust while passing through the furnace and thereby reduce the available contact surface of the oxide, a new supply of fresh material having maximum surface is continuously provided. This overcomes any difficulty experienced by so-called poisoning or exhaustion of the catalytic agent.

We claim:

1. A process for sulphuric acid production comprising roasting an iron-sulfur mineral at a temperature below the sintering point of the sulphur mineral to produce the maximum amount of ferric oxide and to liberate sulfur dioxide, advancing the roasted materials and liberated gases concurrently with air in contact with one another to form sulfur trioxide, and producing contact of the sulfur trioxide with water vapor under conditions to form sulphuric acid.

2. A process for producing sulphuric acid comprising roasting a sulfur-iron mineral at a temperature below the sintering point of the sulphur mineral to liberate sulfur dioxide and form the maximum amount of ferric oxide with the maximum number of pores per unit mass thereof, advancing the liberated gases and roasted minerals concurrently with air to form sulfur trioxide, maintaining a temperature to prevent combination of the trioxide with metal oxides, and causing contact between the trioxide and water vapor to form acid.

3. A process for producing sulphuric acid comprising initially roasting a sulfur-iron mineral slowly at a low temperature not above 550° C. for slow liberation of sulfur dioxide, then raising the roasting temperature to complete the roast, advancing the roasted minerals and gases with air to form sulfur trioxide, and causing contact between the trioxide and moisture under conditions to form sulphuric acid.

4. A process for producing sulphuric acid comprising roasting a sulfur-iron mineral initially at a low temeperature not above 550° C. and stirring the same rapidly during the early stage of the roast, raising the temperature to complete the roast, advancing the liberated gases and minerals concurrently with air to convert the sulfur dioxide into sulfur trioxide, and combining the trioxide with moisture to form acid.

5. A process for the production of sulfur trioxide comprising roasting a sulfur-iron mineral with air at temperatures between 250° C. and 550° C. to form ferric oxide and sulfur dioxide, continuously advancing the roasted minerals and liberated gases with air concurrently, lowering the temperature to form sulfur trioxide, maintaining a temperature high enough for the formation of sulfur trioxide and to prevent its decomposition and to retard the formation of metal sulfates, and removing the sulfur trioxide.

6. A process for producing sulphuric anhydride comprising roasting a sulfur-iron mineral initially at a low temperature and stirring the same rapidly during the early stages of the roast, raising the temperature to complete the roast, advancing the minerals and liberated gases concurrently in the presence of air at temperatures between 450° C. and 750° C. to form sulfur trioxide, and to retard the formation of metal sulfates and prevent decomposition of the trioxide.

In testimony whereof we affix our signatures.

MELVILLE F. COOLBAUGH.
JOHN BURNS READ.